United States Patent
Matsunaga

(10) Patent No.: US 6,225,519 B1
(45) Date of Patent: May 1, 2001

(54) METHOD AND APPARATUS FOR TREATING A WASTE SUBSTANCE USING A THERMIT REACTION

(75) Inventor: Masahiro Matsunaga, Tokyo (JP)

(73) Assignee: Terrabond, Ltd., Tokyo (JP)

( * ) Notice: Subject to any disclaimer, the term of this patent is extended or adjusted under 35 U.S.C. 154(b) by 0 days.

(21) Appl. No.: 09/211,306

(22) Filed: Dec. 14, 1998

(30) Foreign Application Priority Data

Dec. 12, 1997 (JP) .................................................. 9-362753

(51) Int. Cl.$^7$ .................................................. A62D 3/00

(52) U.S. Cl. .................. 588/200; 588/205; 588/206; 588/207; 588/215; 588/218; 588/221; 588/224; 588/231; 588/238; 588/242; 588/244; 588/246

(58) Field of Search .................................. 588/200, 205, 588/206, 207, 215, 221, 231, 238, 244, 246, 242, 218, 224

(56) References Cited

U.S. PATENT DOCUMENTS 4,216,041 * 8/1980 Deardorff et al. .................. 588/231
4,230,053 * 10/1980 Deardorff et al. .................. 588/209
5,790,963 * 8/1998 Welham .............................. 588/202

OTHER PUBLICATIONS

Derwent–ACC–No: 1998–365796 (Abstract of JP 10141636 A), May 1998.*

* cited by examiner

Primary Examiner—Steven P. Griffin
Assistant Examiner—Eileen E. Nave
(74) Attorney, Agent, or Firm—Koda & Androlia

(57) ABSTRACT

A waste substance such as toxic compounds used in chemical weapons and industrial wastes including incineration ash is treated by a thermit reaction agent by way of supplying the waste substance to a combustion region of the thermit reaction agent or by adding way of heating the blended material comprising the waste substance and thermit reaction agent. The waste substance is fed into the combustion region of a thermit-type hypergolic fuel containing as its principal component a thermit reaction agent composed of an aluminum powder and a metal oxide powder, thus breaking down such a waste substance using the combustion heat of the thermit-type hypergolic fuel. The waste substance can be blended with a thermit reaction agent and fed into a combustion chamber so that the blended material is heated by way of a burner, so that the blended material is directly heated by a burner during the continuation of thermit reaction following the start of the thermit reaction of the thermit reaction agent. The heating of the blended material is executed by way of the surface heating by the burner and the thermit reaction heat generated inside the blended material.

15 Claims, 6 Drawing Sheets

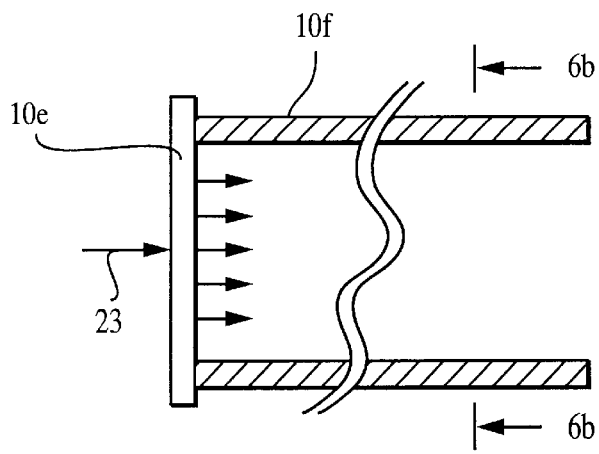
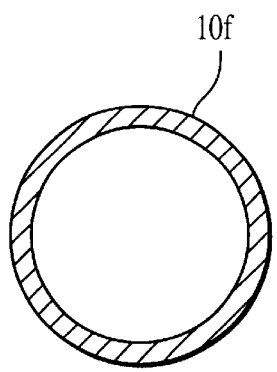
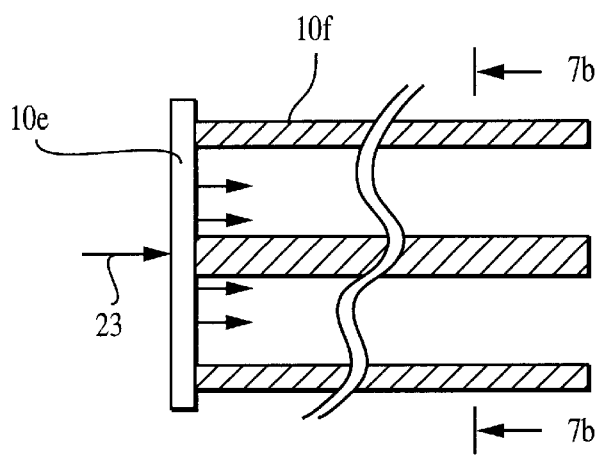
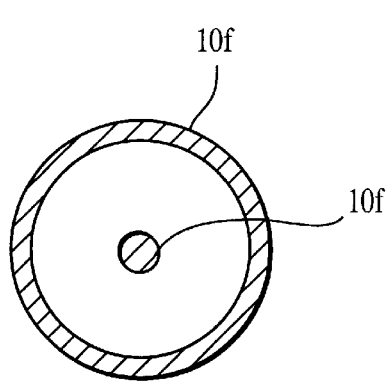
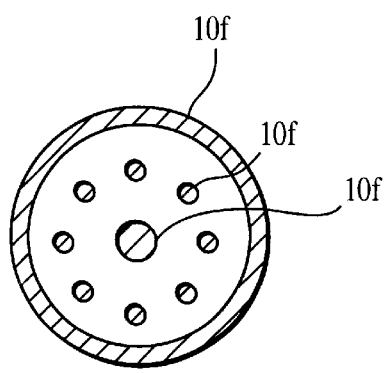

METHOD AND APPARATUS FOR TREATING A WASTE SUBSTANCE USING A THERMIT REACTION

BACKGROUND OF THE INVENTION

1. Field of the Invention

The present invention relates to a method and apparatus for treating a waste substance using a thermit reaction, and more particularly to a method and apparatus for processing waste substance, for instance, toxic compounds used in chemical weapons and industrial wastes including incineration ash so as to make the waste substance harmless and reusable.

2. Prior Art

In light of the adoption of the Chemical Weapons Convention which concerns prohibition on the use of chemical weapons, etc., the establishment of techniques for rendering harmless the toxic compounds used in chemical weapons has become an urgent matter.

The toxic compounds used in chemical weapons should be understood in their broadest meaning so as to include various types of gas warfare agents. Gas warfare agents as the toxic compounds used in chemical weapons are those defined as follows ("Kagaku Daijiten" (Chemical encyclopedia), Kagaku Daijiten Henshuiinkai, ed., Kyoritsu Shuppan K.K., published Mar. 15, 1984). Specifically, gas warfare agents are: liquid or solid compounds having poisonous properties that can be formed into a gas or fumes; and substances which injure the functions of the living body generally or locally, and which are used in warfare for the purpose of injuring the enemy.

Nekrascov's theory is known with regard to the relation of the structure of toxic compounds that constitute the gas warfare agents and their toxicity. The toxic compounds used in chemical weapons referred to in the present invention should be understood to include all compounds indicated by the rule of thumb described below in which Nekrascov's theory is applied to gas warfare agents.

From Nekrascov's theory (rule of thumb applied to gas warfare agents), the structures of gas warfare agents can be classified as follows:

(1) Halogenated esters. e.g.: methyl chloroformate, phosgene ($COCl_2$), diphosgene.
(2) Halogenated ethers and thioethers. e.g.: dichlordimethyl ether, ypperite (mustard gas, dichlordiethyl sulfide) [$(CH_2ClCH_2)_2S$].
(3) Halogenated ketones. e.g.: chloracetone, bromacetone.
(4) Aromatic compounds having halogens on side chains. e.g.: benzyl chloride, benzyl iodide.
(5) Halogenated nitro compounds. e.g.: dichlorpicrin.
(6) Cyanogen compounds. e.g., cyanogen chloride, bromobenzyl cyanide.
(7) Arsenic compounds. e.g., lewisite ($ClCH=CHAsCl_2$), chlordiphenylarsine, ad,nsite.
(8) Organic phosphate compounds.

According to the Nekrascov's theory, substances having a toxic action are constituted as having foxophores within their molecules and having an auxotox that characterizes the toxic action of the foxophore. Examples of the foxophores include the following: —C(=O)—, —S—, —C=C—, —N($O_2$), —N=C, —As—, etc. Examples of the auxotoxes include the following: halogens, oxygen atoms, amino groups, benzyl groups, phenyl groups, methyl groups, ethyl groups, etc.

In the past, several methods have been known and used for rendering harmless toxic compounds used in chemical weapons, for example, the specified gas warfare agents such as yperite (mustard gas) and lewisite.

For example, methods that have been proposed and put into practice are: to induce the decomposition of the toxic compound used in chemical weapons in a high temperature combustion region by creating a high-temperature atmosphere of 1400° C. or above by the combustion of a fuel; to induce the decomposition of the toxic compounds used in chemical weapons by means of a substance (such as silver) that is activated by ultraviolet irradiation in a solution system; and to induce the decomposition of the toxic compounds used in chemical weapons by means of a molten metal.

However, the above decomposition methods for toxic compounds used in chemical weapons have various defects. In order to create a closed system for rendering materials completely harmless, the decomposition device is large. The decomposition treatment capacity is too small, and the methods are extremely inefficient for the treatment of the vast quantities of compounds used in chemical weapons that have been used in the past and are presently stored. The treatment not only of toxic compounds extracted and removed from chemical weapons but also toxic compounds that occlude or impregnate the warhead materials of chemical weapons, as well as the surrounding soil into which toxic compounds have leaked from the warhead materials of chemical weapons and which are contaminated with the toxic compounds (hereinafter referred to simply as surrounding soil), etc., is extremely difficult or impossible.

On the other hand, melting-treatment techniques that use thermit reactions have been known as methods in the volume reduction treatment of waste products such as industrial waste products and household garbage as disclosed in, for example, Japanese Patent Application Laid-Open (Kokai) Nos. H9-60844 and H7-331354.

In the techniques disclosed in Japanese Patent Application Laid-Open (Kokai) Nos. H9-60844 and H7-331354, incineration ash or the like is melted into slag using the large quantity of heat (super-high heat) produced by oxidizing aluminum, thus reducing the volume of the waste product and sealing the heavy metals and dioxins contained in the waste product in the slag, making them harmless. Such a slag is then used as, for instance, concrete aggregate, thus being made into a renewable resource.

This method is considered to be superior to those treatment methods previously used such as electric melting furnaces, burner melting furnaces, plasma melting furnaces and the like in terms of conservation of energy costs relating to electric power, file, etc., the scale of the facility, and reduction of equipment costs.

Nevertheless, in conventional self-sustaining type melt treatment using thermit reaction heat, problems have occurred such as unevenness of the thermit reaction, producing heat generation failure or interruption of heat generation due to fluctuations in the blend ratio or blended state or of the material properties of the thermit reaction agent (or merely thermit agent) and the material to be treated such as incineration ash.

SUMMARY OF THE INVENTION

Accordingly, the object of the present invention is to provide a method and apparatus for treating waste substances including toxic compounds used in chemical weapons and industrial waste including incineration ash, etc.

It is another object of the present invention is to provide a method and apparatus which radically improves conventional detoxification methods, such as combustion processes, so as to be able to render toxic compounds used in chemical weapons harmless efficiently and economically by using the extremely high-temperature combustion heat (reaction heat) generated in the reaction of a thermit-type hypergolic fuel having a thermit reactant composed of an aluminum powder and a metal oxide powder and used as the heat source for decomposition of various types of toxic compounds used in chemical weapons.

The above object is accomplished by a unique method of the present invention wherein into a combustion region of a thermit-type hypergolic fuel that contains as its principal component a thermit reactant composed of an aluminum powder and a metal oxide powder, toxic compounds used in chemical weapons are supplied, and the toxic compounds are broken down by the combustion heat of the aforesaid thermit-type hypergolic fuel.

Furthermore, in the present invention, the thermit-type hypergolic fuel is composed of: aluminum powder and metal oxide powder which constitute the thermit reactant, fragments of warhead materials used in chemical weapons and/or soil (surrounding soil) that has been contaminated by compounds used in chemical weapons that have leaked out of chemical weapons, and the components above are subjected to a treatment which renders them harmless at the same time that the compounds used in chemical weapons are also treated so as to be harmless.

In addition, in the present invention, the thermit-type hypergolic fuel is composed of: aluminum powder and metal oxide powder which constitute the thermit reactant; fragments of warhead materials used in chemical weapons and/or soil (surrounding soil) that has been contaminated by compounds used in chemical weapons that have leaked out of chemical weapons; blends of various types of ash materials (including dust collector ash) and/or plastic waste materials as industrial waste materials, and the components above can be subjected to a treatment which renders them harmless at the same time that the compounds used in chemical weapons are also treated so as to be harmless.

It is still another object of the present invention to provide a treatment method and apparatus which solve the problems of energy cost and increased size and cost of facilities when a burner melting furnace is used for treating industrial wastes such as incineration ash, etc,; to induce a reliable exothermic reaction in a thermit reaction agent both continuously and stably; to accelerate the increase of the thermit reaction temperature in the furnace; and to promote the smooth flow of treatment material that has been converted into slag in the furnace and allow recovery to be performed easily.

The above object is accomplished by the method of the present invention for teating waste substance such as incinerating ash and toxic compound used in chemical weapons, using a thermit reaction, whereby a thermit reaction agent (or merely thermit agent) is added to and blended with the waste substance, and using a burner in a thermit reaction furnace, such a blended material is made to produce a thermit reaction by being heated to a reaction temperature, and the blended material is melted into a slag, in which the blended material is directly heated by a burner during the continuation of reaction following the start of the thermit reaction, and heating is performed by means of both the surface heat created by the burner and the thermit reaction heat from the bottom or interior of the blended material.

Furthermore, the above object is accomplished by a unique apparatus of the present invention for treating waste substance such as incinerating ash and toxic compounds used in chemical weapons, using a thermit reaction in a thermit reaction furnace, in which a blended material formed by adding and blending a thermit reaction agent to the waste substance is fed to a thermit reactor furnace, and a thermit reaction is induced by heating the blended material to a thermit reaction temperature so that the blended material is formed into slag by melting, the thermit reactor furnace is provided with a burner that directly heats and melts the blended material even during the continuation of reaction after the starting of the thermit reaction of the blended material.

In the above structure, a furnace floor is inclined downward from a blended material feeding side of the furnace to a discharge side of the furnace; a blending means, which adds and blends the thermit agent with the waste substance, and a feeding means, which further feeds the blended material that has been fed from the blending means into the thermit reaction furnace, is provided on the blended material feeding side of the furnace; and the blending means comprises a tubular casing, which receives the feed of the waste substance, and a supply means, which is inserted into the casing along the feeding direction of the waste substance and supplies the thermit agent to the feeding means while forming a cylindrical cross-section in the waste substance.

BRIEF DESCRIPTION OF THE DRAWINGS

FIG. 6 is a diagram illustrating one type of tubular thermit-type hypergolic fuel used in the present invention;

FIG. 7 is a diagram illustrating another type of tubular thermit-type hypergolic fuel used in the present invention;

FIG. 8 is a diagram illustrating still another tubular thermit-type hypergolic fuel used in the present invention;

DETAILED DESCRIPTION OF THE PREFERRED EMBODIMENTS

Figure 1:
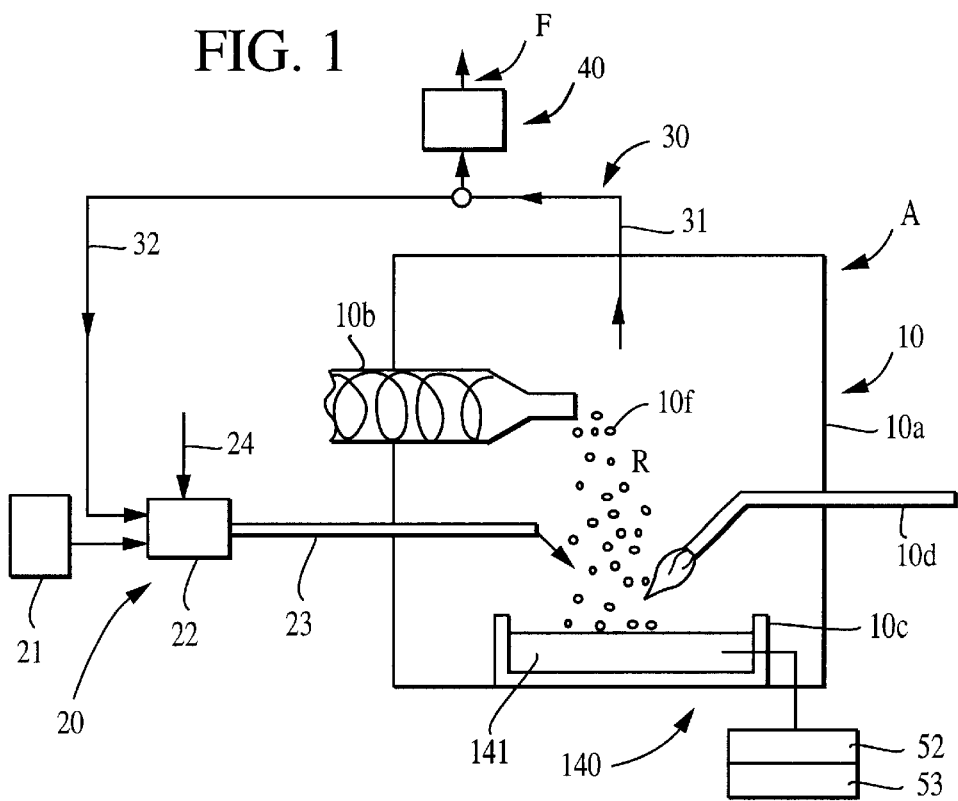
FIG. 1 illustrates a one type of combustion-decomposition device in which the waste substance is treated in accordance with the present invention.
Figure 2:
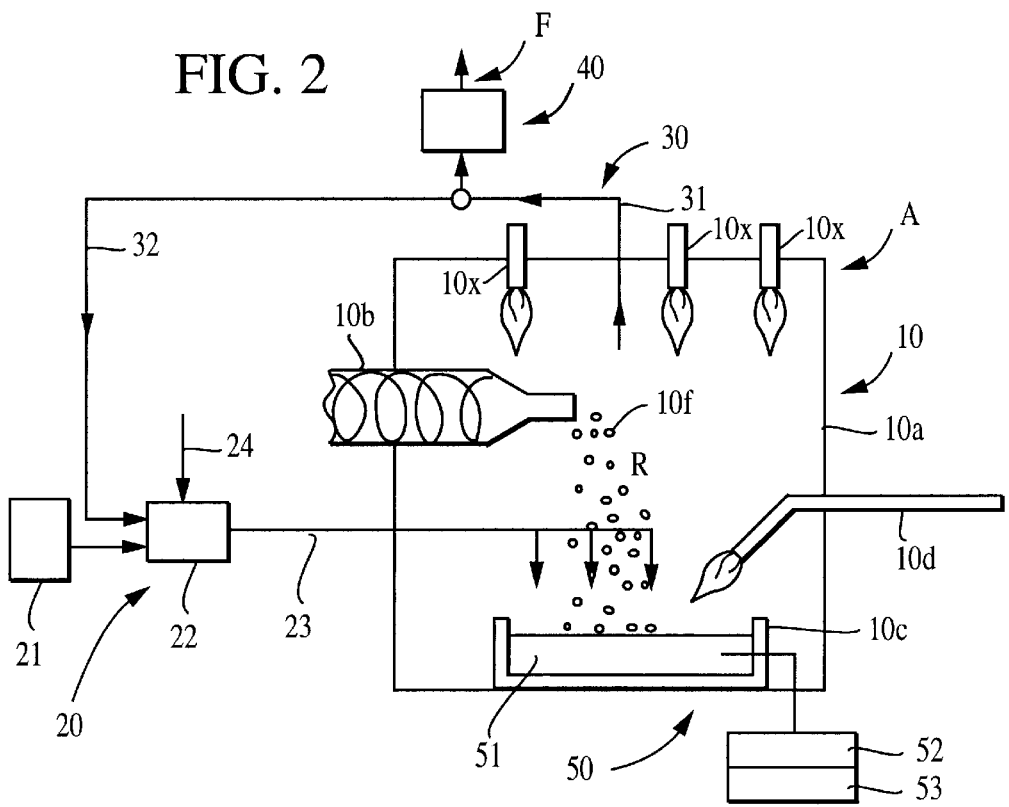
FIG. 2 illustrates another type of combustion-decomposition device in which the waste substance is treated in accordance with the present invention.
Figure 3:
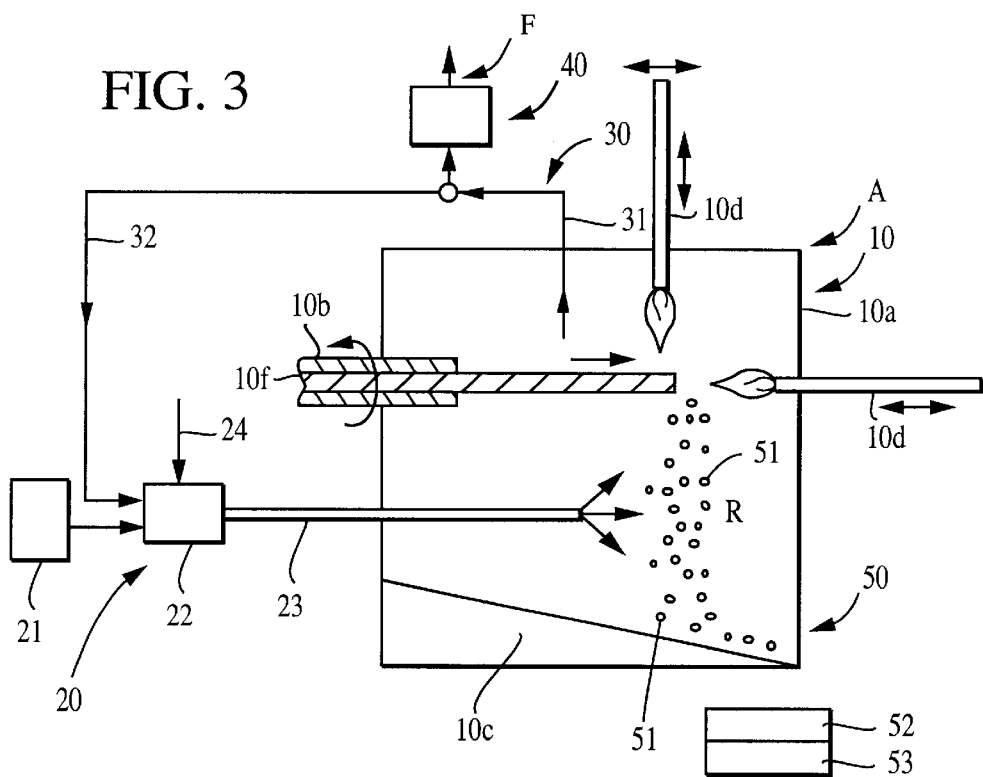
FIG. 3 illustrates still another type of combustion-decomposition device in which the waste substance is treated in accordance with the present invention.

The thermit reaction is first briefly explained. The thermit reaction is a generally known process, and it refers to the reaction phenomena as indicated generally by the following formula (1) wherein an intense exothermic reaction occurs when a blend of aluminum powder and metal oxide powder is ignited, the metal oxide is reduced, and the metal produced in melted due to the high temperature and is recovered at the bottom of a reactor.

$$2Al + 3/2\text{-}O_2 = Al_2O_3 + 386.2 \text{ Kcal} \quad (1)$$

The thermit reaction is explained in terms of a blend of Al powder and iron oxide ($Fe_3O_4$) powder. When the above-described mixture is ignited (approximately 1100° C. to 1150° C.), the thermit reaction is promoted in accordance with the following equation (2), and at this time the reaction system is exposed to a high temperature of 2750° C. or higher. Under these reaction conditions, although the precision of terminology is lost, a thermit plasma is produced.

$$8Al + 3Fe_3O_4 = 9Fe + 4Al_2O_3 \quad (2)$$

Next, a thermit-type hypergolic fuel that contains the thermit reaction agent is explained.

The thermit-type hypergolic fuel of the present invention includes, as the main ingredients, two components of aluminum powder and metal oxide powder which are both thermit reactants.

The thermit-type hypergolic fuel generates an extremely high combustion heat of 2750° C. or higher when burned, and it can be considered that substances that have been contaminated by toxic compounds used in chemical weapons are rendered completely harmless and decomposed in such a high temperature atmosphere as 2750° C. or above. Accordingly, the thermit-type hypergolic fuel of the present invention, in addition to aluminum powder and metal oxide powder, may further include:

(i) fragments of chemical weapon warhead materials that have been contaminated by toxic compounds used in chemical weapons, (ii) surrounding soil that has been contaminated by compounds used in chemical weapons that have leaked out of chemical weapons, (iii) various types of ash materials as industrial waste materials, including incineration ash, (iv) waste plastics as industrial waste materials, and (v) blends of the above-listed materials.

In the case of the materials (i) and (ii), only the substances contaminated by the toxic compounds used in chemical weapons are subjected to combustion-decomposition. In the case of (2)(iii) and (iv), the ash materials and waste plastics, for which the need for detoxification treatment is high, are used as a combustion material when the toxic compounds used in chemical weapons are subjected to combustion-decomposition, thus rendering these constituents harmless. Additionally, in the materials of (v), the substances contaminated by the toxic compounds used in chemical weapons as well as the ash materials and waste plastic are rendered harmless.

The thermit-type hypergolic fulel of the present invention may be a desired form or shape such as granular (including powders), rod-shaped, or tubular-shaped, etc. In addition, various combustible media for anchoring or bonding the various components which contribute form-holding properties can be added to the constituent elements.

The combustible medium includes a natural mineral oil-based substance, synthetic oil-based substance, plastic waste material, and the like. Among these, it is not necessary to additionally use plastic waste materials when plastic waste materials are used as one of the components of the thermit-type hypergolic fuel.

Furthermore, as the combustible media, natural mineral oil-based substances such as heavy oil, kerosene, lubricating oil, and waste oil, and synthetic oil-based substances such as ester-based or low-molecular-weight polymers (polyethylene waxes, etc.) can be used.

The combustible medium are used so as to bind or attach the various components when the various components of the thermit-type hypergolic fulel are blended by, for example, a kneader or extruder. By the use of such means, a thermit-type hypergolic fuel in which the various components are evenly distributed are obtained.

The blend ratio of the constituents of the thermit-type hypergolic fuel, i.e., the thermit reactant composed of aluminum powder and metal oxide powder, the fragments of warhead materials and surrounding soil contaminated with toxic compounds used in chemical weapons, the various types of ash materials and/or waste plastics blended from the standpoint of simultaneous treatment of industrial waste materials, and also the combustible medium, can be set as desired and is not subject to any special restrictions.

For example, the blended weight ratio of thermit reactant, i.e., aluminum powder and metal oxide powder, can be set at 1:2 to 1:4.

In addition, when the aluminum powder and metal oxide powder are used as a melt-solidifier, for the warhead material fragments and soil (surrounding soil) contaminated with toxic compounds used in chemical weapons and ash materials (hereinafter referred to as "other components") the blend weight ratio of the melt-solidifier and other components generally can be set in a range of 1:1 to 1:4.

Furthermore, when the aluminum powder and metal oxide powder are used as a melt-solidifier for the other components, the blend weight ratio of the melt-solidifier, the other components, and the combustible medium generally can be set at 2:2:1 to 2:8:1.

When waste plastic is added to ash materials, or when waste plastic alone is used instead of ash materials, the blend weight ratio of the waste plastic can be set as desired similarly to the blend weight ratio of the ash materials.

Moreover, the thermit-type hypergolic fuel of the present invention may also contain other blend components, such as thermit reaction promoters (sulfides, chlorides, etc.), ignition agents (barium peroxide, aluminum powder, etc.).

Next, the combustion system of the thermit-type hypergolic fuel of the present invention is described.

In the present invention, the thermit-type hypergolic fuel generates an extremely high reaction heat (combustion heat) when it is burned. For this reason, from the standpoint of maintaining durability and flame resistance of the combustion furnace over a long period, it is desirable that the thermit-type hypergolic fuel be burned in a non-contact state with the constituent material (flame-resistant bricks, etc.) of the combustion furnace.

In order to realize the non-contact combustion system in a combustion furnace of the thermit-type hypergolic fuel, it is preferable to form the fuel into a solid rod shape. This is because, with the use of the solid rod-shaped fuel, combustion can be induced from the end portions of the fuel rods, which are in an overhanging state, without coming into contact with the furnace material. In other words, the thermit-type hypergolic fuel of the present invention can burn in space.

In addition to the bar-shape as described above, the thermit-type hypergolic fuel can take any desired form, including granular (pellet), rod-shaped, tubular, etc.

In the method of the present invention, when the thermit-type hypergolic fuel is composed of thermit reactants (aluminum powder and metal oxide powder) and at least one component selected from the group consisting of fragments of warhead materials and surrounding soil contaminated by toxic compounds used in chemical weapons, or ash materials as industrial waste materials, then the component (except for the thermit reactants) is melted by the intense exothermic reaction of the thermit reactant and becomes a melt that has been rendered harmless. Such a melt can be received in a desired receiving vessel, then cooled and solidified. The cooling can be performed in a desired fashion. For instance, it can be quick-cooled and water-granulated with cooling water, forming a water-granulated slag (solid) in a glass state. The melt can also be air-cooled, forming an air-cooled slag (crystallized slag).

The melt-solidified material produced as a result of the combustion-decomposition of the present invention can be reused as an aggregate or fine aggregate for concrete, a cushion material for sewer construction, a roadbed material, a block material for road coverings, a water-permeable block material, etc.

Next, the toxic compounds used in chemical weapons that are treated by the present invention will be described.

The toxic compounds used in chemical weapons that can be rendered harmless and decomposed by the method of the present invention should be understood in the broad sense, thus including toxic compounds such as yperite (mustard gas) and lewisite. For example, S-LOST or N-LOST [bis-(2-chlorethyl)-sulfide and -imine], and VX([O-alkyl-S-(N, N-dialkylaminoethyl)-alkylthiophosphide], etc. are included. In addition, the toxic compounds may be a single compound or multiple toxic compounds.

The toxic compound is supplied in a desired form to a combustion system of the thermit-type hypergolic fuel and subjected to combustion-decomposition. Thus, the toxic compound can be supplied in a gaseous and/or liquid form to the combustion system.

In the present invention, the toxic compounds can be supplied into a melt produced by the combustion of the thermit-type hypergolic fuel. In such cases, the toxic compounds are partially decomposed in the melt, and further, the gas component discharged from the melt is completely decomposed in a high-temperature combustion region by the thermit-type hypergolic fuel.

By means of the combustion-decomposition method of the present invention, various types of toxic compounds can be rendered completely harmless and decomposed.

Needless to say, acidic substances and basic substances produced by the combustion-decomposition are subjected to neutralization treatment in exhaust gas treatment systems and treated so that secondary pollution is not produced. Furthermore, minute amounts of toxic compounds that have been decomposed of course can be adsorbed in an adsorption medium such as activated carbon, preventing toxic compounds from being expelled from the decomposition treatment system.

The combustion-decomposition method of the present invention is described below in greater detail.

In the following description, an air stream (gas stream) containing a desired concentration of yperite (mustard gas) is adopted as the toxic compounds used in chemical weapons, and such is supplied to the combustion system of the thermit-type hypergolic fuel.

As seen from FIG. 1, the combustion decomposition device A for toxic compounds used in chemical weapons includes the following principal elements: a combustion device 10, a feeding device 20 for feeding the toxic compounds, an exhaust gas tube 30, an exhaust gas treatment device 40, and a melt treatment device 50.

The combustion device 10 is comprised of a combustion chamber main body 10a, a fuel feeder 10b, a combustion furnace 10c, and an ignition device 10d.

The fuel feeder 10b includes an extruder (screw feeder) which houses a screw for uniformly blending the ingredients of thermit-type hypergolic fuel 10f and forming them into granules (for example, fuel pellets having a size of approximately 2 mm). The fuel 10f is of course mainly composed of a thermit reactant that is formed of aluminum powder and a metal oxide powder.

The granular-type fuel 10f is fed continuously onto the combustion furnace 10c. The fuel 10f that has been fed into the furnace 10c is ignited by the ignition device 10d (with the ignition temperature set to 1100 to 1150° C., for example), and continuously burns by its own combustion heat.

The fuel 10f, when ignited, burns continuously, but it is possible to operate the ignition device 10d only for ignition but also thereafter in order to maintain combustion completely.

The toxic compounds used in chemical weapons are fed into a combustion region R of the fuel 10f by a feeding device 20.

The toxic compound depending upon its type is in a liquid or solid state at room temperature; and in the shown embodiment, it is supplied to the combustion region R of the fuel 10f in a gaseous state and is rendered harmless and decomposed by combustion by the extremely high combustion heat (reaction heat) of the combustion region R.

The combustion region R assumes a plasma state due to the reaction heat produced by the thermit reaction, and the toxic compounds that are in a gaseous state are completely decomposed and rendered harmless in the thermit plasma.

In this embodiment, the toxic compounds are supplied in a gaseous state to the combustion system, but it can of course be supplied in a liquid state.

The feeding device 20 for the toxic compounds has a source material container 21, a gassification device 22, and a feeding tube 23. In addition, in order to feed oxygen in a desired amount into the combustion system, an air feeding tube 24 is provided.

When the fuel 10f is in a state in which oxygen is supplied in a sufficient amount to the combustion region, the air feeding tube 24 is not necessarily required.

The toxic compounds are decomposed by combustion, and the exhaust gases produced thereby are removed by an exhaust gas tube 30. The exhaust gas tube 30 is composed of an exhaust gas main tube 31 and a bypass 32, which circulates at least a portion of the exhaust gas to the combustion device 10 via the feeding device 20 for the purpose of rendering it completely harmless. Although not shown, a dust collector may of course be provided in the exhaust gas tube 30.

The exhaust main tube 31 of the exhaust gas tube 30 is connected to an exhaust gas treatment device 40. Due to the combustion-decomposition in the combustion region of the thermit-type hypergolic fuel 10f, acidic substances, etc. are produced in the exhaust gas, and these components which are sources of secondary pollution are treated in the exhaust gas treatment device 40.

As the exhaust gas treatment device 40, a publicly known exhaust gas treatment system can be used, and the device is not subjected to any particular limitations.

The specific constitution of the exhaust gas treatment device 40 is not described in detail; however, the exhaust gas treatment device 40 can be composed of a neutralizing device which neutralizes acidic substances in the exhaust gas, a heat exchange device which recovers heat in the exhaust gas, an adsorption device for recovering unreacted components (minute amounts of toxic chemicals) and desired components in the exhaust gas, a dust collector, and an exhaust tube (chimney), etc.

Among these constituent elements, the adsorption device which is composed of activated carbon, etc. for removing unreacted toxic compounds from the exhaust gas is useful.

In the drawing, the reference symbol F indicates clean exhaust gas discharged into the atmosphere.

As described above, a melt in which the elements constituting the fuel 10f are melted is obtained by the high combustion heat of the thermit-type hypergolic fuel 10f.

When the thermit-type hypergolic fuel 10f is composed of a thermit reactant (aluminum powder and metal oxide powder) or is formed using warhead materials or surrounding soil contaminated by toxic compounds used in chemical weapons in addition to the thermit reactant, then the melt is a molten blend of these components; and such a melt can be cool-hardened and reused as an aggregate for concrete, road bedding materials, etc.

Moreover, in the present invention, various types of ash materials (including dust collector ash) and waste plastic which are industrial waste products that have a high need for treatment to render them harmless can also be used as constituent elements of the thermit-type hypergolic fuel 10f, and in such cases as well a similar melt is obtained that is used as an aggregate for concrete, road bedding materials, etc.

Figure 4:
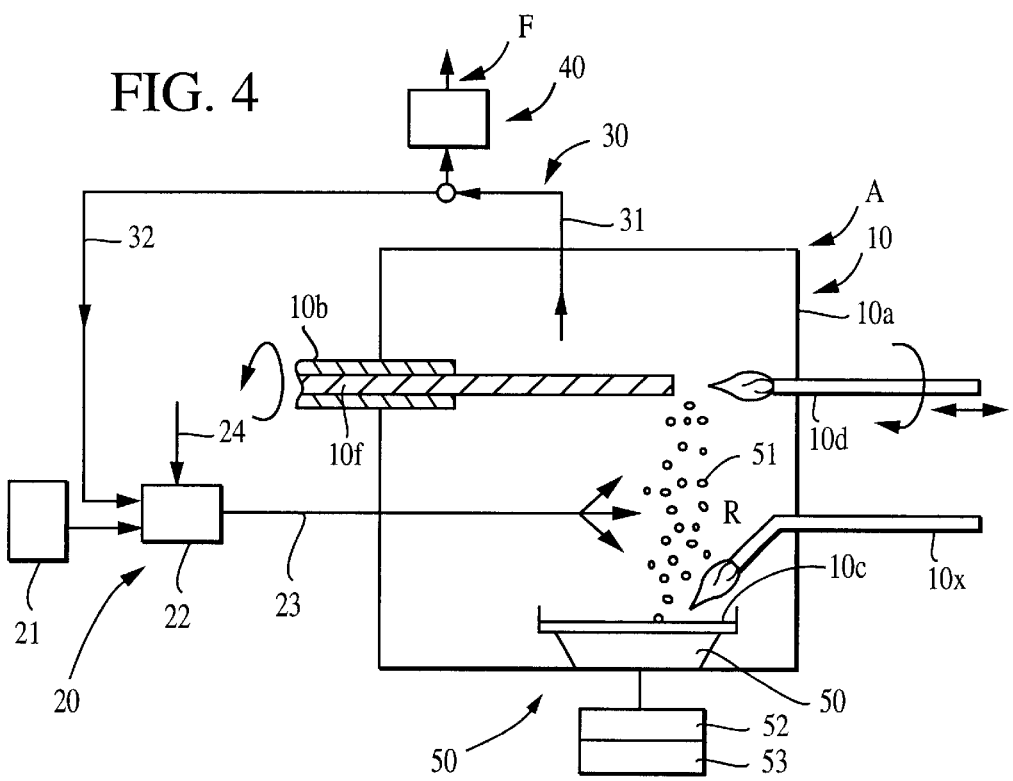
FIG. 4 illustrates still another type of combustion-decomposition device in which the waste substance is treated in accordance with the present invention.

For this reason, the combustion-decomposition device shown in FIG. 4 also uses a melt—treatment device 50 as shown in FIG. 1.

The melt-treatment device 50 is composed of a melt receiving dish 52 that receives the melt 51 accumulated in the combustion furnace 10c and a melt hardening dish 53 which cools and hardens the melt 51.

The function of the melt hardening dish 53 can be combined with that of the melt receiving dish 52; and the melt hardening dish 53 of course may be constituted as an air-cooling type system which uses air cooling or a quick-cooling type which uses water, etc.

Figure 5:
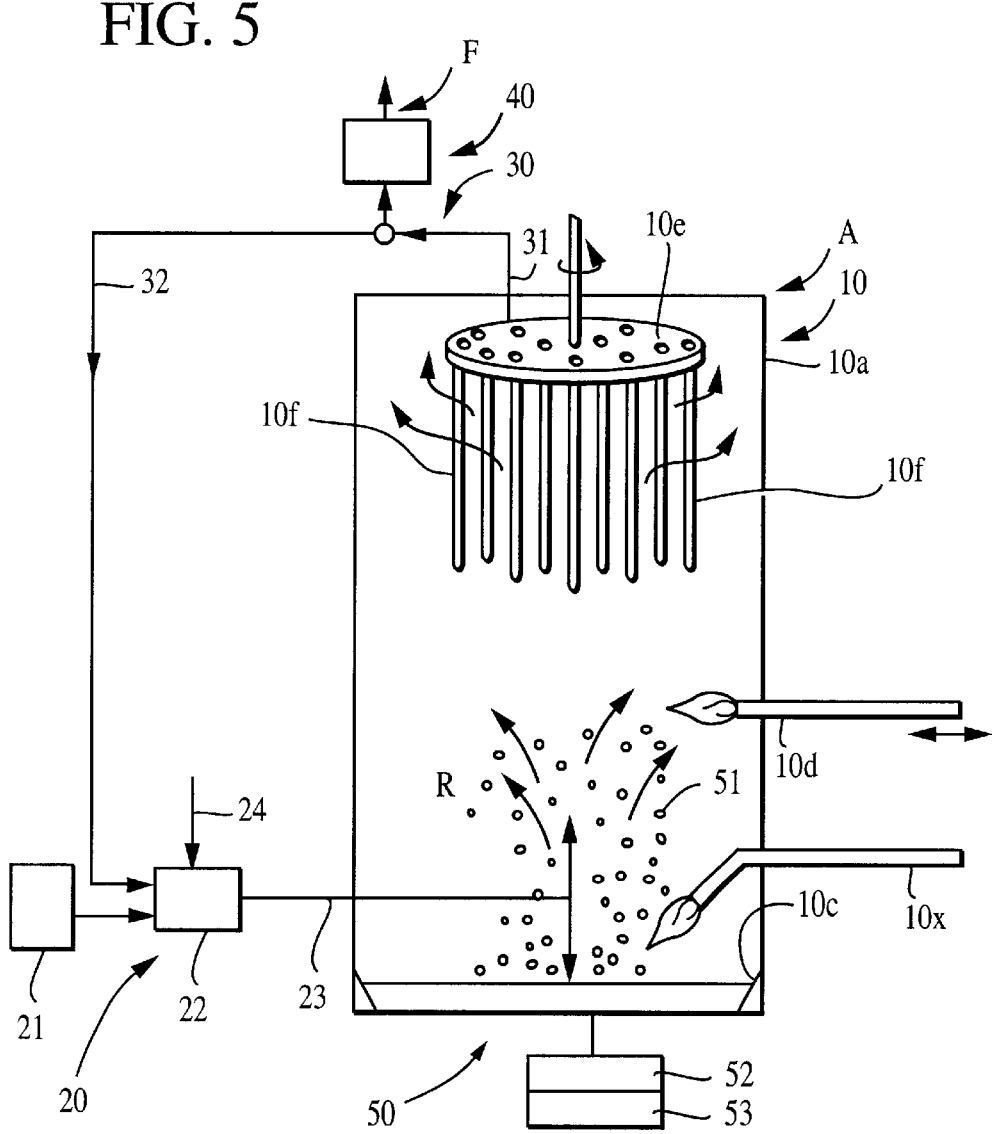
FIG. 5 illustrates still another type of combustion-decomposition device in which the waste substance is treated in accordance with the present invention.

FIG. 5 shows another embodiment of the combustion-decomposition device.

The combustion-decomposition device of FIG. 5 differs from that of FIG. 4 in that the forward end part of the feeding tube 23, in which toxic compounds with a gaseous state flows, is comprised of a plurality of tubes so that the gaseous toxic compounds can be steadily and evenly supplied to the combustion region R and decomposed. In addition, three auxiliary burners 10x are provided in the combustion chamber main body 10a in order to effect the complete combustion of the exhaust gas.

In the combustion-decomposition device shown in FIG. 6, the thermit-type hypergolic fuel 10f is formed as rods in which the various ingredients are bonded by means of a desired binder or adhesive as described above, and ignition device 10d suitable for the shape of the rod-shaped fuel 10f is provided; and otherwise the constitution is practically the same as that of FIG. 4.

The rod-shaped thermit-type hypergolic fuel 10f is extruded and supplied in compliance with the burning speed from the front end portion of the fuel feeder 10b as seen from FIG. 6. The rod-shaped fuel 10f is rotated so as to be able to burn uniformly.

As seen from FIG. 6, two types of ignition devices 10d are provided: one is able to maintain a desired distance in the horizontal direction from the fuel 10f and the other is able to maintain a desired distance in the vertical direction from the fuel 10f and can be moved in the horizontal direction. With the combination of the shape of the fuel 10f and two ignition devices 10d, the rod-shaped fuel 10f can be completely burned.

The ignition devices 10d, in the same way as the rod-shaped fuel 10f, can be provided so as to rotate, thus facilitating the fuel 10f to burn completely.

Due to the combustion of the rod-shaped fuel 10f, a melt 51 of the fuel components is produced at the same time as combustion and drops down onto the combustion furnace 10c which has an inclined wall surface. Even after the melt 51 has dropped onto the combustion furnace 10c, it retains sufficient ability to burn and decompose toxic compounds used in chemical weapons. Thus, combustion-decomposition can be performed efficiently.

The device shown in FIG. 7 differs from the device of FIG. 6 in that a combustion furnace 10c which receives the melt 51 produced by the combustion of the rod-shaped fuel 10f is installed in the combustion chamber main body 10a, and a combustion auxiliary burner 10x is provided so as to perform the complete combustion of the melt 51 and the combustion-decomposition of toxic compounds in a gaseous state by means of the melt 51; and otherwise the devices shown in FIGS. 6 and 7 are practically the same.

FIG. 8 shows still another combustion-decomposition device A for toxic compounds used in chemical weapons according to the present invention. In this device, a fuel holding plate 10e which can be rotated is provided inside the combustion chamber main body 10a of the combustion device 10, and a desired number of thermit-type hypergolic fuel rods 10f are circularly provided on this holding plate 10e.

The toxic compounds in a gaseous state are produced by the combustion of the fuels 10f and are supplied so as to flow toward the melt 51 which naturally drops into the combustion furnace 10c and are blown on the surface of the melt 51 in the combustion furnace 10c.

In addition, a combustion auxiliary burner 10x is provided so that the melt 51 and the toxic compounds used in chemical weapons can be completely burned and decomposed in the combustion furnace 10c.

The thermit-type hypergolic fuel 10f used in the present invention is not limited to a granular (pellet form) or rod form as described above, and other forms of the fuel 10f are described below.

Figure 9:
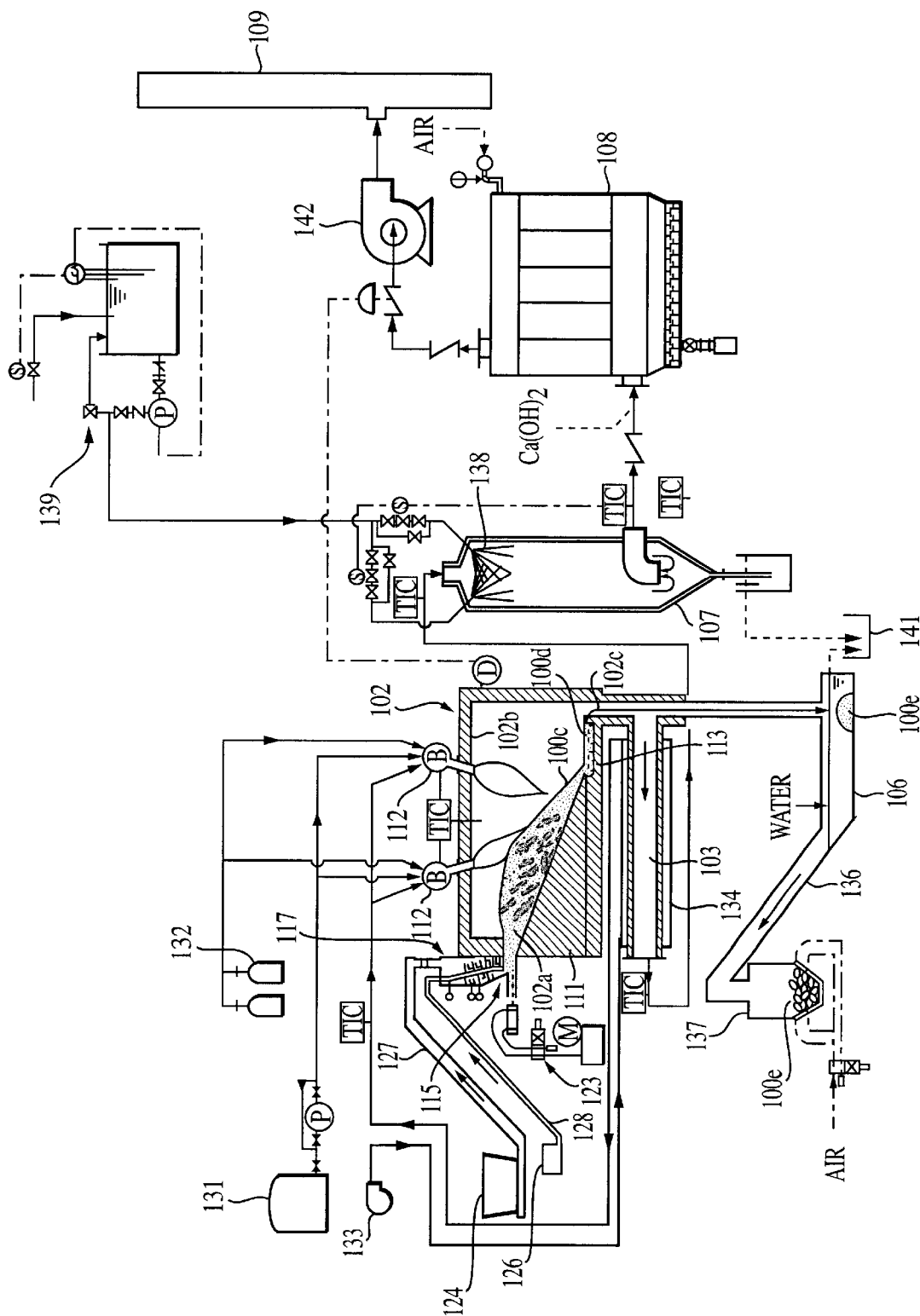
FIG. 9 shows the overall system for treating a waste substance according to the present invention.

FIG. 9 shows a tubular thermit-type hypergolic fuel 10f. As seen from FIG. 9, the tubular thermit-type hypergolic fuel 10f is fixed on the fuel holder 10e at one end thereof The fuel holder 10e receives a supply of a gaseous toxic compound used in chemical weapons from the feeding tube 23 for the gaseous toxic compound and releases the toxic compound into the interior space of the tubular fuel 10f The tubular fuel 10f, when burning from the end portion thereof, burns and decomposes the toxic compound used in chemical weapons that has been released into the interior space of the tubular fuel 10f.

Figure 10:
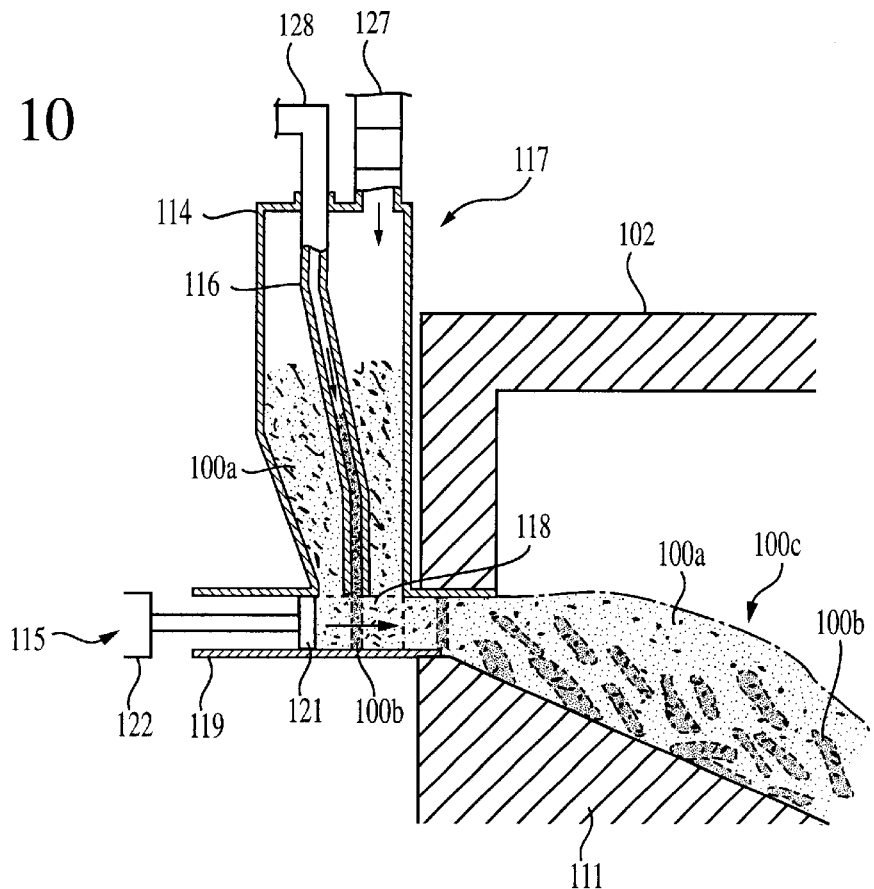
FIG. 10 is an enlarged cross-sectional diagram showing the structure for feeding the object into the thermit reaction furnace.

FIG. 10 shows another configuration of the tubular thermit-type hypergolic fuel 10f. In FIG. 10, a rod-shaped fuel 10f is provided in the center of the inside space of the tubular fuel 10f.

Figure 11:
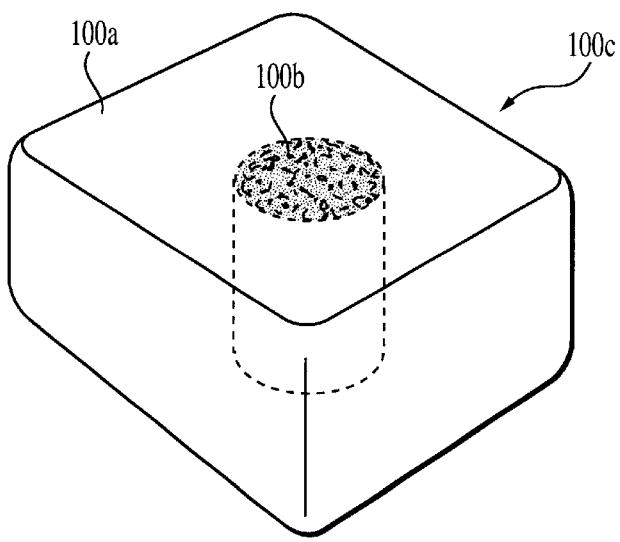
FIG. 11 is a perspective diagram showing the hypothetical form of the object to be supplied to the furnace.

In FIG. 11, a plurality of fuel rods 10f are further circularly provided so as to be located between the central rod fuel 10f and the surrounding tubular fuel 10f.

As seen from the above, the combustion-decomposition method for toxic compounds used in chemical weapons, which uses a combustion system of a thermit-type hypergolic fuel composed mainly of a thermit agent (aluminum powder and metal oxide powder), efficiently burns and produces intense heat due to a thermit reaction of the present invention and economically treat the toxic compounds.

Since toxic compounds used in chemical weapons can be completely decomposed in the intense combustion heat (thermit plasma) of the thermit-type hypergolic fuel, undecomposed toxic compounds and secondary pollutants such as harmful exhaust gases are not produced; and the fused solid obtained from the combustion system has numerous excellent qualities which allow it to be reused (made into a renewable resource).

In addition, various types of toxic compounds used in chemical weapons including highly toxic yperite (mustard gas), lewisite, etc. are rendered completely harmless and undergo combustion-decomposition efficiently and economically.

In light of the spirit of the recently adopted Chemical Weapons Convention, toxic compounds used in chemical weapons in the past have been buried in large quantities in the soil of numerous battlefields and at present are being stored in storage facilities, and a detoxification treatment is urgently desired.

According to the combustion-decomposition method of the present invention, it is possible to use warhead materials and the surrounding soil that have been contaminated with toxic compounds used in chemical weapons, for which detoxification treatment has been demanded, simultaneously as constituent elements of the fuel.

In addition to rendering toxic compounds harmless, the cooled solid (slag) of the melt obtained as a byproduct after combustion can be reused as concrete aggregate, etc.

Furthermore, in the present invention, various types of ash materials (including dust collector ash) which are industrial waste products in addition to the thermit reactant can be used to constitute the thermit-type hypergolic fuel; accordingly, volume reduction and resource regeneration of the ash material can be achieved in addition to rendering toxic compounds used in chemical weapons harmless. Thus, the present invention has important significance as a technique for preventing pollution by ash materials.

In the combustion-decomposition method of the present invention, the thermit-type hypergolic fuel can be constituted using combustible waste materials such as plastic waste materials that are industrial waste materials in addition to the thermit reactant. Since the combustible waste materials that are industrial waste materials can be rendered harmless and burned in addition to rendering toxic compounds, the present invention has important significance as a technique for treatment of combustible industrial waste materials.

In addition, the thermit-type hypergolic fuel can also be composed by a combination of combustible waste materials and non-combustible waste materials. In such cases as well, the present invention has important significance as a treatment technique for industrial waste materials.

Next, a description in which a waste substance is treated by way of the present invention will be further provided; and the description will be made about incineration ash as an example.

As the general layout shown in FIG. 9, a thermit reaction furnace 102 is provided as the main constituting element, and a thermit reaction is induced in this furnace 102. In other words, a blended material 100c obtained by adding a thermit reaction agent (or merely called Athermit agent") to incineration ash is introduced in the furnace 102, and the material 100c is melted and formed into a slag by the reaction heat generated by the thermit reaction.

More specifically, an exhaust gas combustion chamber 103 and a hardening tank 106, wherein the molten slag 100d is pulverized and hardened into granular slag 104e by water permeation cooling, are connected to the exhaust side (or downstream side) of the reaction furnace 102.

Furthermore, a gas cooling chamber 107, wherein the exhaust gas undergoes wet cooling, a dust collection chamber 108, wherein dust collection is performed, and a chimney 109 for discharging exhaust gas are provided so as to be connected in sequence by means of piping on the downstream side of the reaction furnace 102.

The reaction furnace 102 is sealed by being enclosed by a surrounding walls made of a heat-resistant material and has a feed-in opening 102a and a discharge opening 102c. The furnace 102 is provided at its bottom with a furnace floor 111 which forms an inclined plane in the direction from the blended material feeding side to the discharge side. In other words, the furnace floor 111 is inclined so that one end of the furnace floor 111 near the feed-in opening 102a is, as seen from FIG. 9, is set to be higher than another end of the furnace floor 111 near the discharge opening 102c.

The furnace 102 is further provided on its sealing (surrounding wall) 102b with two burners 112 so that the openings of the burners 112 face the interior of the furnace 102 so that the burners 112 perform a combustion heating of the interior of the furnace 102. On the bottom end (discharge end) of the furnace 102 to which the furnace floor 111 is inclined downward, a receiver 113 in the form of a box is provided so that it receives a slag 100a that is the blended material 100 melted into a glass state by the heat applied to the blended material 100.

A blending means 117 and a supply means 116 are provided adjacent to the feed-in opening 102a of the furnace 102 so as to be located outside of the furnace 102. In other words, the blending means 117 and the supply means 116 are provided on the blended material feeding side of the furnace 102. The blending means 117 is composed of a casing 114, which is in the form of a hopper, so that the thermit agent 100b is added to and blended with the incineration ash 100a therein, thus forming a blended material 100c. The supply means 116 is arranged in a core pipe form that extends in a perpendicular direction in approximately the center of the casing 114.

The bottom end of the blending means 117 forms a rectangular blending space 118, and a guide 119 having a cylindrical form with a rectangular cross-section is placed on the outside of this space 118. A piston 121 is housed in this guide 119 so that it can reciprocates (or moves right and left in FIG. 9), and the piston 121 is driven inside the guide 119 in reciprocal motion by a pusher 122 that is a hydraulic cylinder. The reference numeral 123 is a hydraulic unit that drives the pusher 122.

An ash hopper 124 which houses the incineration ash 100a and a thermit hopper 126 which houses the thermit agent 100b are installed in the vicinity of the blending means 117. The discharge end of each of the hopper 124 and the thermit hopper 126 are connected to the upper portion of the casing 114 (see FIG. 10) of the blending means 117 via conveyers 127 and 128. Instead, the discharge end of the hopper 126 may be connected to the upper end of the supply means 116. The feeding amount (i.e., blending ratio) of the materials supplied can be altered by adjusting the feeding speed of the conveyers 127 and 128 and the amount of material fed from the hoppers 124 and 126 to the conveyers 127 and 128.

In regards to the waste or the incineration ash described above, all types of incineration ash such as industrial waste products and everyday trash, dust collector ash, etc. are included and processed by the apparatus described above. Furthermore, toxic compounds used in chemical weapons can be also treated as the wastes by the apparatus in substantially the same fashion as the incineration ash is treated. In addition, as to the thermit reaction agent, it includes generally known reaction agents such as aluminum powders and iron oxide, copper oxide, and other metal oxide patterns.

In the embodiment described above, the aluminum and metal oxide such as iron oxide is blended in a ratio of 1:3 (wt. parts) so as to form the thermit reaction agent. Furthermore, the thermit agent composed of the aluminum and metal oxide is blended to the wastes at a ratio of 1 to 50% (wt. parts).

The wastes or incineration ash 100a and thermit agent 100b are fed to the blending means 117 and then supplied into the space 118 provided at the bottom of the casing 114 as shown in FIG. 10 so that the thermit agent 100b forms a cylindrical core located in the approximate center of the incineration ash 100a that is formed into a rectangular parallelepiped mass; and when the incineration ash 100a and the thermit agent 100b are pushed by the pusher 122, they are shaped into the clump-like form of the blended material 100c as shown in FIG. 11.

The blended material 100c that has been extruded from the feed-in opening 102a into the reaction furnace 102 while being formed into the rectangular parallelepiped form as described above is fed sequentially onto the inclined furnace floor 11 of the furnace 102. In this case, the thermit agent 100b inside the blended material 100c assumes a predetermined solid form and sinks to the floor (deep layer part) near the furnace floor 11 due to the fact that its own specific gravity is greater than that of the incineration ash and due to the relation between the operation direction of the piston 121 and the structure of the furnace floor; on the other hand, the waste or incineration ash flows and is layered on the discharge side along the upper surface of the furnace floor 11 as indicated in FIG. 9 in a state of displacement toward the upper portion of the blended material as a whole.

The burners 112 are, as described above, provided so as to face downward from the sealing 102b of the reaction furnace 102 toward the blended material 100c that is supplied thereinto. Heavy oil is supplied from an oil tank 131 to the burners 11 and burned by the burners 11 so that the blended material 100c is heated by the burners 11 directly from its surface by the irradiated heat of the fire burning out of the burners 11. In addition to heavy oil, kerosene, gas, etc. can be used as the fuel for heating the blended material 100c.

The reference numeral 132 is a gas tank for the liquid petroleum gas (LPG) used when lighting the burner 111. When combustion is done by the burner 112, air is supplied by an air supplying blower 133, and this air passes through a cooling jacket 134 formed around the exhaust gas combustion chamber 103, becoming preheated high-temperature air.

When the furnace interior reaches a temperature of 1400° C. to 1600° C., which is the melting temperature of the incineration ash, by heating using the burners 112, the incineration ash 100a in the blended material 100c melts; however, when the temperature of approx. 1100° C. to 1150° C., which is the redox reaction (thermit reaction) temperature of the thermit agent, is reached, the thermit reaction of the thermit agent 100b begins, so that the blended material is actually melted from the upper surface thereof by the burners 11 and also from the bottom or interior of the blended material at a super-high temperature due to the thermit reaction heat thereof (approx. 2000° C. to 2750° C.).

The molten slag 100d flows downward along the inclined furnace floor 11 and collects in the receiver 113; and it flows out through the discharge opening 102c and falls into the hardening tank 106, thus being impregnated by the water in the tank, and thereby quick-cooled and pulverized into granules.

The granular slag 100e that has been hardened and pulverized in the hardening tank 106 is carried to the molten slag hopper 137 by a slag refinement conveyer 136 and is further cooled and collected.

Meanwhile, a combustion chamber 103, into which the exhaust gas produced in the reaction furnace 102 is introduced and burned, is provided on the downstream side of the discharge opening 102c. The exhaust gas burned there is guided into a cooling chamber 107 equipped with a spray nozzle 138 in the upper portion of its interior so that moist cooling by sprayed water is performed. The reference numeral 139 is a water feeding unit that supplies cooling water to the cooling chamber 107.

The cooling water flowing out of the cooling chamber 107 and hardening tank 106 is expelled and collected in a water receiving tank 141; and after the exhaust gas that has been cooled is drawn into a dust collector 108 provided with a bag filter, etc. and subjected to dust collection treatment, it is drawn into the exhaust block 142 and is then released into the atmosphere from the smoke exhausting element (chimney) 109.

As seen from the above, the method and apparatus of the present invention as described above offer the following effects:

(1) In contrast with ash melting performed by thermit reaction heat only, which has the possibility of interruption of the melting process unless a thermit agent is added in an amount equivalent to at least 30% of the ash, more reliable continuous operation can be accomplished by the present invention which uses a burner heating in addition to a thermit reaction heating. When the thermit agent introduced in the present invention is used in a blend ratio of 5% to 30% of the incineration ash, it offers the highest efficiency in terms of stability, continuity, combustion cost, etc.; and when the object to be melted is ordinary incineration ash in which the blend ratio is approximately 10 to 15%, melting costs are extremely inexpensive compared with surface melting by a burner or thermit melting.

(2) The melting temperature can be varied (in the range of, for example, 1400° C. to 2500° C.) with stability and freedom by increasing or decreasing the amount of thermit agent to be added; thus, the types of objects processed by the method and apparatus of the present invention can be widened; and even the objects that are considered to be difficult to melt such as asbestos can be melted into a slag.

(3) Since the thermit reaction heat is able to produce a reaction heat of 2000° C. or higher from the moment of reaction, the process is extremely fast. For this reason, the time to reach the melting temperature is not wasted, and running costs such as fuel expenses, electrical expenses, and water expenses are extremely inexpensive.

(4) The furnace can be decreased in size, and high performance with compact size can be achieved.

(5) Compared to the melting treatment that uses a thermit reaction only, there is absolutely no slag residue occurs in the furnace after operation is halted.

(6) Since oxygen is not required for the thermit reaction, the amount of exhaust gas is extremely small, which provides a beneficial effect in terms of global warming.

(7) Since a dual melting is achieved simultaneously by burners from the surface of the melting object (ash) and by the heat of the oxygen-free reaction from the bottom (interior), the reliability of melting is improved.

As seen from the above, the present invention not only overcomes the defects of thermit reaction furnaces and burner-type melting furnaces as a whole, but also offers the benefit of being able to make maximum use of the advantages of both methods.

What is claimed is:

1. A method for treating a waste substance by way of combustion-decomposition, comprising the steps of:

feeding said waste substance into a combustion region of a fuel having as its principal component a thermit reactant composed of an aluminum powder and a metal oxide powder at a ratio of 1:2–4, and wherein a ratio of said thermit reactant to said waste substance is 5 to 30%, decomposing said waste substance by combustion heat of said fuel, completing burning and decomposing the waste substance with auxiliary burners, and recirculating at least a portion of exhaust gases from the burning and decomposition of the waste substance back to said combustion region.

2. A method according to claim 1, wherein said waste substance comprises toxic compounds used in chemical weapons, and said fuel is a thermit reactant hypergolic fuel.

3. A method according to claim 2, wherein said thermit-reactant hypergolic fuel comprises:

aluminum powder and metal oxide powder; and fragments of warhead materials used in chemical weapons that is contaminated with toxic compounds used in chemical weapons.

4. A method according to claim 2, wherein said thermit-reactant hypergolic fuel comprises:

aluminum powder and metal oxide powder;

fragments of warhead materials used in chemical weapons that have been contaminated with toxic compounds used in chemical weapons; and surrounding soil containing toxic compounds used in chemical weapons that have flowed out from a warhead of a chemical weapon contaminated with toxic compounds used in chemical weapons.

5. A method according to claim 2, wherein said thermit reactant hypergolic fuel comprises:

aluminum powder and metal oxide powder;

fragments of warhead materials used in chemical weapons that have been contaminated with toxic compounds used in chemical weapons; and at least one selected from the group consisting of ash composed of incineration ash and/or dust collector ash, and plastic waste materials.

6. A method according to claim 2, wherein said thermit reactant hypergolic fuel comprises:

aluminum powder and metal oxide powder;

fragments of warhead materials used in chemical weapons that have been contaminated with toxic compounds used in chemical weapons; and surrounding soil containing toxic compounds used in chemical weapons that have flowed out from a warhead of a chemical weapon contaminated with toxic substances used for chemical weapons; and at least one selected from the group consisting of ash composed of incineration ash and/or dust collector ash, and plastic waste materials.

7. A method according to any one of claims 2 through 6, wherein said thermit reactant hypergolic fuel contains a combustible medium for binding constituent ingredients thereof.

8. A method according to claim 7, wherein said combustible medium is one selected from the group consisting of natural mineral oil-based substances, synthetic oil-based substances, and plastic waste materials.

9. A method according to claim 2, wherein said thermit reactant hypergolic fuel is in one form selected the group consisting of granular, rod-shaped and tubular.

10. A method according to claim 2, wherein said toxic compounds used for chemical weapons are supplied to a combustion region of a thermit reactant hypergolic fuel in at least one of liquid form and gaseous form.

11. A method according to claim 2, wherein said toxic compounds used in chemical weapons are supplied to at least one of a combustion region of a thermit reactant hypergolic fuel and a combustion melt of said thermit reactant hypergolic fuel.

12. A method according to claim 2, wherein at least a portion of exhaust gas obtained from a combustion-decomposition of said toxic compounds used in chemical weapons is supplied by recirculation to at least one of a combustion region of a thermit reactant hypergolic fuel and a combustion melt of said thermit reactant hypergolic fuel.

13. A method for treating a waste substance using a thermit reaction, wherein a thermit agent comprising an aluminum powder and a metal oxide powder at a ratio of 1:2–4 is added to and blended with said waste substance at a ratio of 5–30% so as to form a blended material, and said blended material is heated in a thermit reaction furnace to a reaction temperature by a burner, thus producing a thermit reaction and melting said blended material into a slag, and wherein said blended material is directly heated by said burner during a continuation of said thermit reaction after the start of said thermit reaction, and heating of said blended material is performed by way of both a surface heating created by said burner and a thermit reaction heating generated from a bottom or inside of said blended material by said thermit reaction and at least a portion of the exhaust gases from the burning of the blended is recirculated into said thermit reaction furnace.

14. A method according to claim 13, wherein said waste substance is one selected from the group consisting of incineration ash and toxic compounds used in chemical weapons.

15. A method according to claim 14, wherein a surface of said blended material is heated substantially by said burner, and said inside of said blended material is heated by heat generated by said thermit reaction.

* * * * *